Patented Sept. 8, 1931

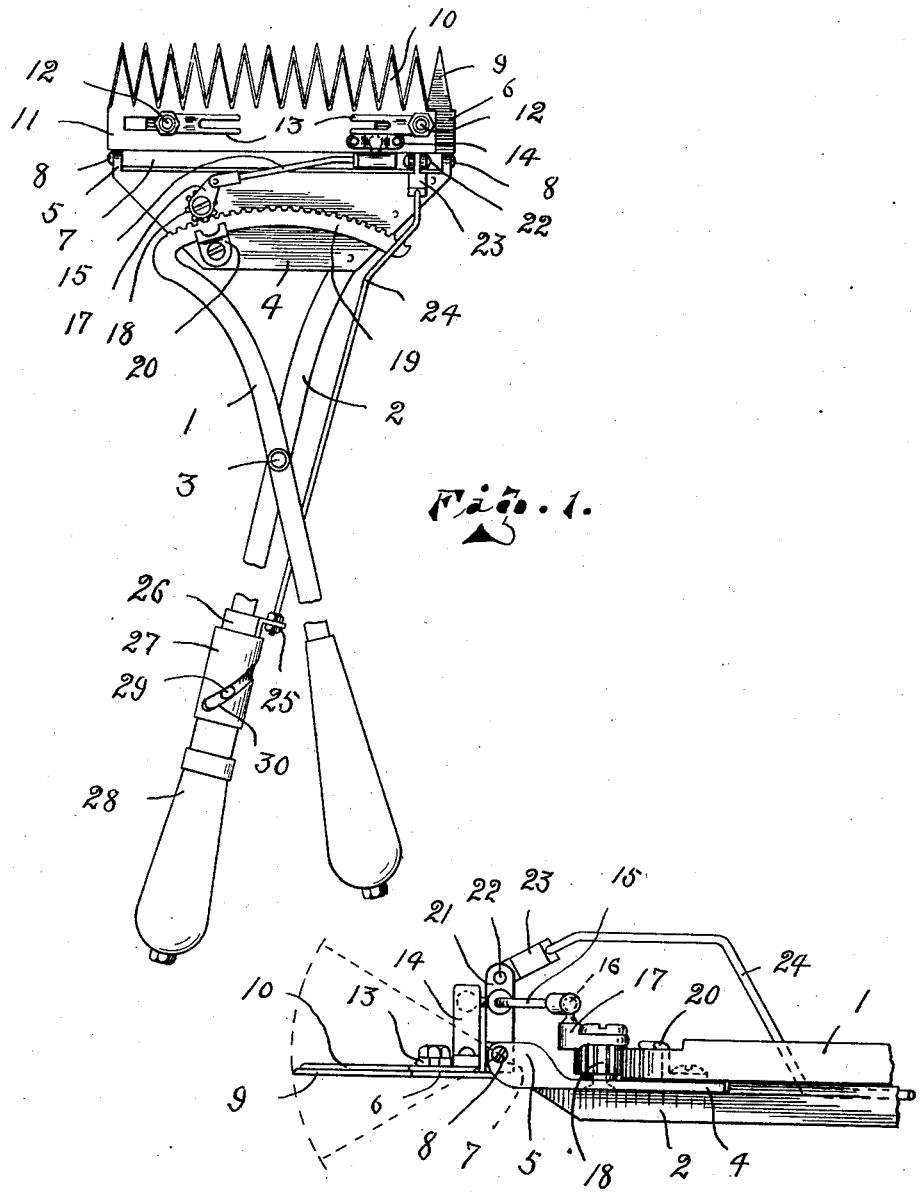

1,822,311

UNITED STATES PATENT OFFICE

OSCAR F. PETERSON, OF DULUTH, MINNESOTA

CLIPPERS

Application filed September 5, 1930. Serial No. 479,903.

This invention relates to clippers and has particular reference to clippers especially adapted for use by hand in the trimming of hedges, grass, and the like.

The principal object is to produce a more practical and efficient device of this character.

Another object is to produce such a device in which the clipping may be done at selective angles at the convenience of the operator.

Other objects and advantages of the invention will appear in the following description thereof.

Referring now to the accompanying drawings, forming part of this application, and wherein like reference characters indicate like parts:

Figure 1 is a top plan view of one of the improved clippers, portions thereof being broken away, and Figure 2 is an enlarged side elevation of the clipper portion of the device.

The embodiment here illustrated is of the shears of pivotal handle type wherein the lateral reciprocal manipulation of the handles operate a pair of saw-tooth sickles. 1 and 2 represent the handles of the device which are pivotally united as at 3, and the inner end of the member 2 carries the sickle bar support indicated at 4, which is in the form of a flat sheet metal member either riveted or otherwise permanently secured to the member 2. This member 4 is provided with upwardly extending lugs 5 upon either outer corner thereof, and intermediate of which lugs is pivotally mounted the stationary sickle bar 6, it having an enlarged transverse reinforcing bar or rib-like member 7, fixed to the upper inner face thereof in which the pivotal pins or screws 8 are attached, they extending through the lugs 5 of the member 4. The outer edge of the sickle bar 6 has formed thereupon a plurality of suitable sharpened saw tooth members indicated at 9, which cooperate with like members 10 on the reciprocable sickle bar 11 which lies flat thereupon. These two bars are slidably united by means of the bolts 12 which are provided with suitable yieldable friction clips 13 common in such devices for insuring a tight union of the sickle teeth.

Adjacent one end of the reciprocable sickle bar and upon the upper side thereof is fixed the bracket 14 to which is attached as by a ball and socket connection the pitman 15 and the opposite end of this pitman is also connected as by a suitable ball and socket joint indicated at 16 to the crank arm 17 fixed to the upper end of the spur gear 18 which is pivotally mounted upon the upper face of the member 4. Meshing with this spur gear 18 is the arcuately shaped rack 19 formed upon the innermost end of the handle member 1 and which rack lies flat upon the upper face of the member 4 and held in proper alignment by a suitable clip 20 so that it is free to travel in its normal arc as governed by the pivotal point of the handle. Thus as the free ends of the handles are moved to and from each other the rack 19 will correspondingly rotate the spur gear 18 which in turn will reciprocate the pitman 15 and thus the cooperative action of the teeth of the sickle blades 6 and 11 produce the cutting operation.

As a means for changing the angularity of the sickle blades in respect to the handle, I have illustrated an upstanding bearing member or bracket 21 fixed to the reinforcing rib member 7 in which is pivotally mounted as at 22 the knuckle 23 in which is screw threadedly fixed the adjusting rod 24, this rod being bent upwardly as clearly shown in Figure 2, and the bracket 21 is of considerable height so that the rod may have free action over the lower terminal of the instrument which occurs beneath same. Then it is bent downwardly and parallel with the lowermost handle 2 of the instrument, with its opposite end connected as at 25 to the protruding hub 26 of the reciprocable sleeve 27, mounted upon the innermost end of the rotatable handhold 28. The shank of the handhold carries a pin 29 extending radially therefrom and into the helical slot 30 in the sleeve 27 so that by rotation of the handhold 28 the sleeve 27 together with the rod 24 is selectively reciprocable for changing the relative angularity of the sickle blades. As is obvious this may be conveniently done while the clippers are being operated, resulting in an exceptionally convenient and expeditious tool.

Having thus described my invention, what I claim and desire to secure by Letters Patent, is:

Clippers of the type described comprising a supporting member, cooperative sickle bars pivotally mounted upon the forward end of the supporting member, a pair of operating handles pivotally united intermediate their ends, one of said handles being fixed to the supporting member and the other of said handles carrying an arcuately shaped rack, a pinion mounted upon the support and engageable with the rack, a pitman connected with the pinion and operating one of the sickle bars, and a rotatable handhold upon the fixed handle, and means connected therewith for changing the angularity of the sickle bars.

In testimony whereof I affix my signature.

OSCAR F. PETERSON.